(12) United States Patent
Judge et al.

(10) Patent No.: US 10,523,064 B2
(45) Date of Patent: Dec. 31, 2019

(54) INTEGRATED WIRELESS POWER SENSOR SYSTEM FOR SENSING AND CONTROL OF EQUIPMENT

(71) Applicant: Computime, Ltd., Queensway (CN)

(72) Inventors: Brenton James Judge, Hong Kong (CN); Wai-Leung Ha, Hong Kong (CN); Kwok Wa Kenny Kam, Hong Kong (CN); Chi Lung Chan, Hong Kong (CN); San Bao Gordon Qian, Shen Zhen (CN); Xiao Jun Zhang, Shen Zhen (CN)

(73) Assignee: Computime Ltd., New Territories (HK)

( * ) Notice: Subject to any disclaimer, the term of this patent is extended or adjusted under 35 U.S.C. 154(b) by 183 days.

(21) Appl. No.: 15/680,572

(22) Filed: Aug. 18, 2017

(65) Prior Publication Data
US 2018/0054092 A1     Feb. 22, 2018

Related U.S. Application Data

(60) Provisional application No. 62/377,000, filed on Aug. 19, 2016.

(51) Int. Cl.
*H02J 50/80*     (2016.01)
*H02J 7/02*      (2016.01)

(52) U.S. Cl.
CPC ............. *H02J 50/80* (2016.02); *H02J 7/025* (2013.01)

(58) Field of Classification Search
CPC ...................... H02J 50/80; H02J 7/025
USPC ............................... 307/104; 320/108
See application file for complete search history.

(56) References Cited

U.S. PATENT DOCUMENTS 10,038,332 B1 * 7/2018 Leabman ............... H02J 7/025
2013/0241468 A1 * 9/2013 Moshfeghi ............ H02J 7/025
                                                       320/107

OTHER PUBLICATIONS

Ostaffe, Harry; "RF-based Wireless Charging and Energy Harvesting Enables New Application and Improves Product Design," retrieved online from: www.mouser.com, 2016, Mouser Electronics, Inc.

* cited by examiner

*Primary Examiner* — Hal Kaplan
(74) *Attorney, Agent, or Firm* — Banner & Witcoff, Ltd.

(57) ABSTRACT

A system utilizes the colocation of the sensing and the control or other powered sections of the product to supplement the environmental conditions in which the energy harvesting sensors operate, thus providing a robust energy source for sensors to operate.

24 Claims, 10 Drawing Sheets

INTEGRATED WIRELESS POWER SENSOR SYSTEM FOR SENSING AND CONTROL OF EQUIPMENT

This patent application claims priority to U.S. provisional patent application Ser. No. 62/377,000 entitled "Integrated Wireless Power Sensor System for Sensing and Control of Equipment" filed on Aug. 19, 2016, which is hereby incorporated by reference in its entirety.

BACKGROUND OF THE INVENTION

There is frequently a need to provide RF sensors at specific points within the whitegoods appliances and industrial machinery to allow for more accurate control or for control at specific points within the appliance and the machinery.

Wires may be cumbersome for the end user thus detracting from the user experience. Wires may not be feasible given the temperatures, movement, or other hazardous conditions between the location of the sensing point and the power supply. While this can be avoided with battery powered sensors, this approach may result in a life time issue requiring the customer to change batteries that may be troublesome or even impossible.

SUMMARY OF THE INVENTION

An aspect supports an appliance that incorporates wireless (e.g., radio frequency and/or ultrasonic) sensors that rely on energy harvesting. The sensors and the system's power supply may be in close proximity so that at least one energy generator radiates a wireless signal to the sensors in order to supplement the extant ambient energy available for energy harvesting.

With another aspect, an appliance generates energy to supplement the ambient environment for the purpose of supporting one or more incorporated energy harvesting sensors used by a home appliance or a piece of industrial equipment/machinery. The same energy generator may transmit a wireless signal to send messages to the sensor.

With another aspect, new devices/sensors may register themselves into an appliance to allow the appliance to communicate with the sensors for the purpose of either sensing and/or energy generation planning.

With another aspect, an appliance determines a schedule based on time or other conditions in planning the power generation for the sensors. The sensors may incorporate energy harvesting technology used to provide information either to the equipment for the purpose of control or to the user.

With another aspect, an appliance may regulate the energy generating circuitry or shut it down in response to inputs received from remote sensors. The appliance may regulate the energy generating circuitry only to be on sufficiently to allow for sensing and/or control of the appliance based on inputs from remote sensors.

With another aspect, an appliance may be configured with a paired appliance for the purpose of providing information to the primary appliance.

With another aspect, an appliance may support one or more of the sensors that communicate its estimated battery life before requiring charging.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

It will be apparent to one skilled in the art after review of the entirety disclosed that the steps illustrated in the figures listed above may be performed in other than the recited order, and that one or more steps illustrated in these figures may be optional.

DETAILED DESCRIPTION

Traditional power harvesting systems rely on extant ambient conditions (for example, radio frequency (RF), light, temperature, sound and movement) as a means to generate energy for these sensors to operate. Traditional systems often suffer from variability in the environment conditions and the relatively low energy that may be extracted from the environment, limiting acceptance in the market.

An aspect of the embodiments utilizes the colocation of the sensing and the control or other powered sections of the product to supplement the environmental conditions in which the energy harvesting sensors operate, thus providing a robust energy source for sensors to operate. In particular, the location of sensors may be located within an appliance. For example, with whitegoods appliances or industrial machinery, sensors are typically within 1 meter away from somewhere where the appliance power can be accessed. Consequently, energy generation circuitry may be placed in close proximity to the energy harvesting sensor.

With an aspect of the embodiments, an appliance incorporates wireless sensors and wireless generators within the appliance. Embodiments may support different types of appliances such as refrigerators, stoves, ovens microwave ovens, washing machines, water heaters, air conditions, clothes dryer, dishwashers, water heaters, and the like.

Embodiments may support different wireless modes including radio frequency (RF), optical (light), sonic (sound) or ultrasonic and electromagnetic induction. Moreover, a sensor may utilize a mode for energy harvesting that may be different from a mode for transmission from the sensor to an energy generator.

Figure 1:
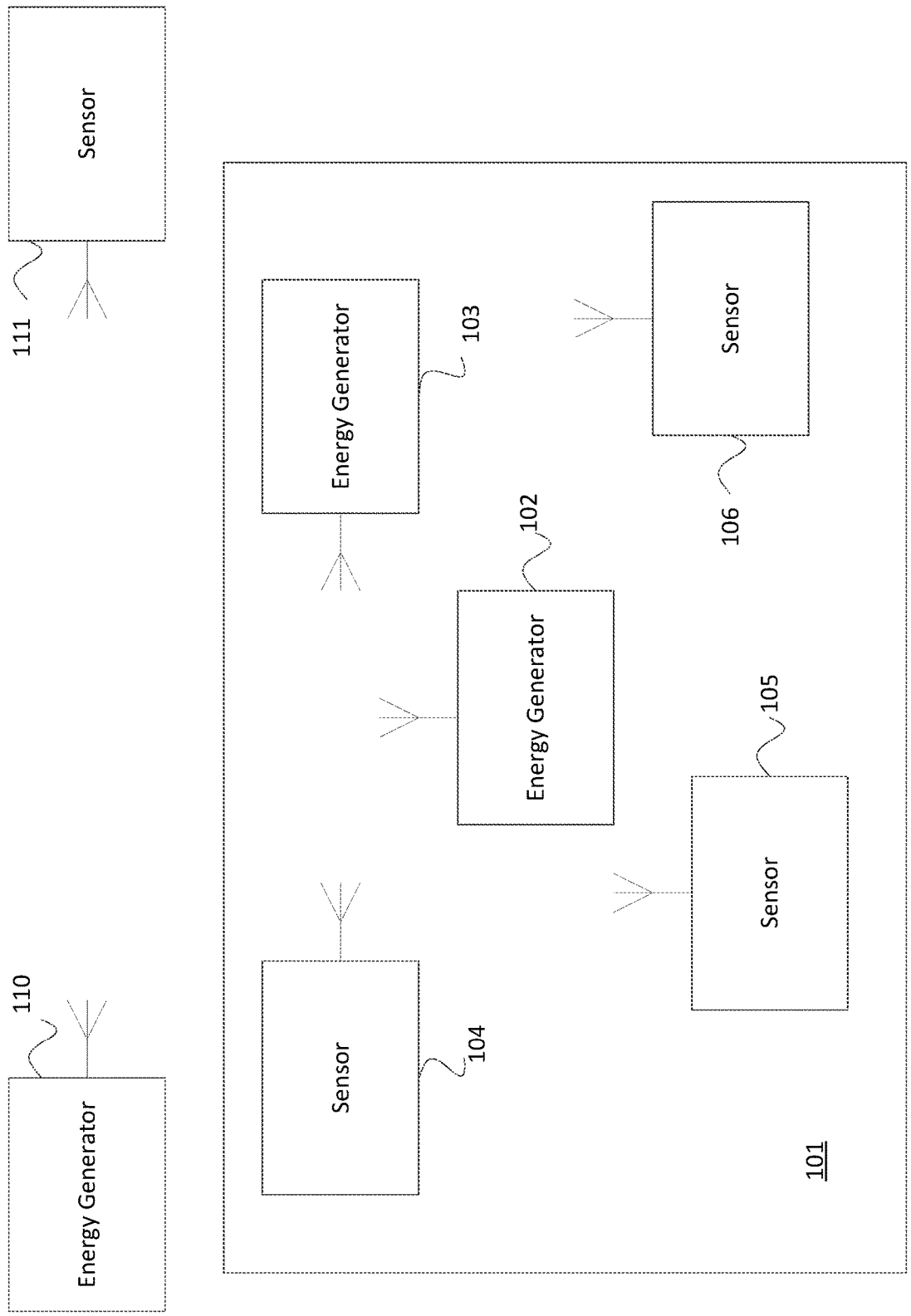
FIG. 1 shows an appliance with embedded energy generators and sensors in accordance with an embodiment.

FIG. 1 shows appliance 101 with embedded energy generators 102-103 and sensors 104-106 in accordance with an embodiment. Also, energy generator 110 and sensor 111 are externally located to appliance 101. Energy generator 110 and sensor 111 may be located in a paired appliance. For example, appliance 101 may comprise a stove while the paired appliance may comprise a hood unit above the stove top.

With some embodiments, an energy generator may provide energy to one or more sensors. For example, energy generator 102 may provide energy for both sensors 104 and 106. Moreover, one or more generators may provide energy for a sensor. For example, energy generators 102 and 103 may provide energy of sensor 105.

Figure 2A:
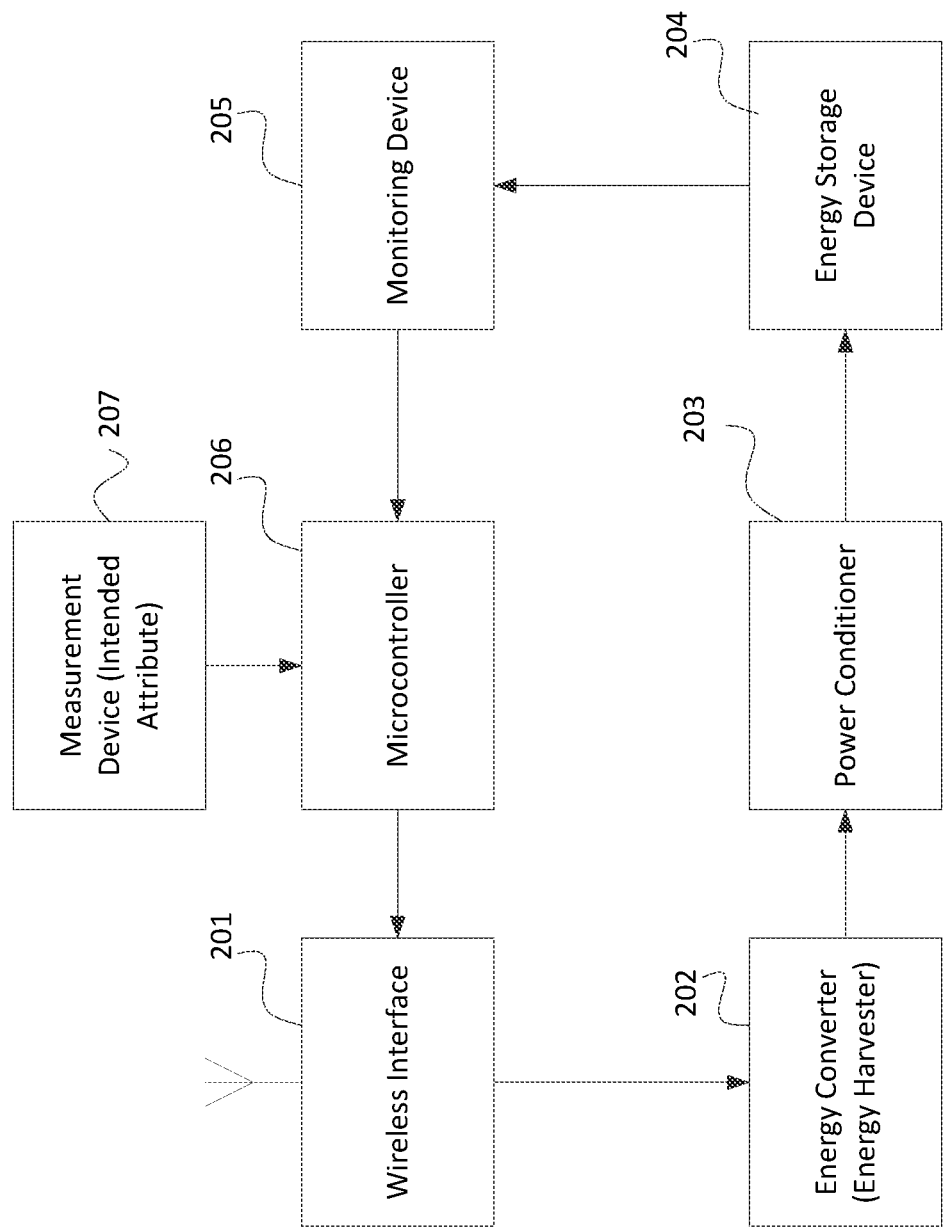
FIG. 2A shows a wireless sensor in accordance with an embodiment.

FIG. 2A shows wireless sensor 104 comprising wireless interface 201, energy converter 202, power conditioner 203, energy storage device 204, monitoring device 205, microcontroller 206, and measurement device 207.

Wireless interface 201 interacts with the wireless channel to extract the wireless signal transmitted by the wireless generator.

Energy converter 202 extracts energy from the wireless signal. For example, energy converter 202 may comprise a rectifier that obtains a direct current (DC) signal from a modulated or unmodulated RF signal received over the wireless signal.

Power conditioner 203 conditions the extracted energy so that energy storage device 204 can efficiently store the extracted energy. Embodiments support differ types of storage devices including capacitors and/or rechargeable batteries. With some embodiments, energy storage device may be a combination of different storage devices such as a capacitor in conjunction with a rechargeable battery.

Monitoring device 205 measures one or more parameters (e.g., voltage) of storage device 204 so that microcontroller 206 can determine the charging state. For example, microcontroller 206 may be a computing device contained in a single integrated circuit that is dedicated to perform one task and execute one specific application. Microcontroller 206 may contain memory, programmable input/output peripherals as well a processor.

Microcontroller 206 may report the charging state via wireless interface 201 through the wireless channel so that energy generator 102 can adjust generated energy contained in the generated wireless signal. In addition, Microcontroller 206 may also send information about intended attribute measurements performed by measurement device 207. For example, a reusable collar may serve as a sensor that reports the temperature of a bottle of wine placed in a refrigerator.

Figure 2B:
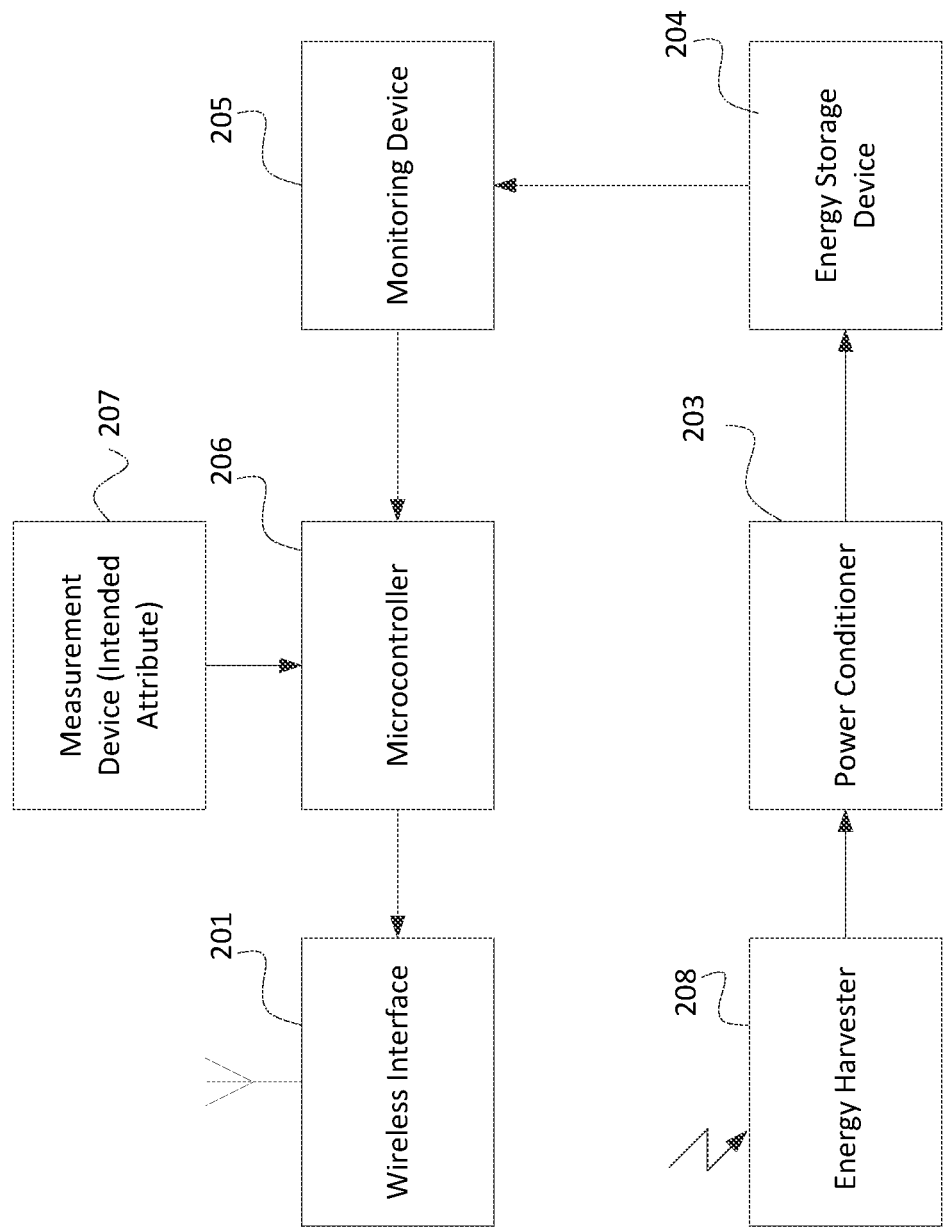
FIG. 2B shows a wireless sensor in accordance with an embodiment.

Wireless sensor 104 may support one or more different wireless channels. For example, energy may be extracted from an ultrasonic signal while sending an RF signal to the appliance to report measurements. FIG. 2B shows an embodiment in which wireless interface 201 sends report messages over an RF communication channel while energy harvester 208 harvests energy extracted from a wireless signal (e.g., an ultrasonic signal) received via a different wireless communication channel.

Figure 3A:
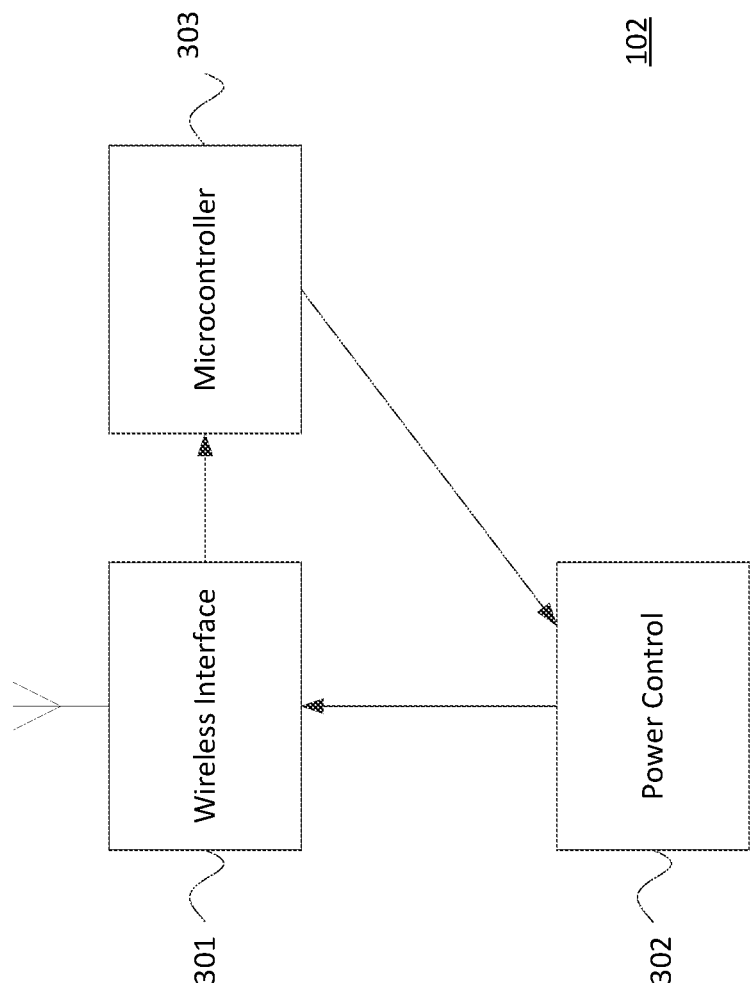
FIG. 3A shows a wireless energy generator in accordance with an embodiment.

FIG. 3A shows wireless energy generator 102 that comprises wireless interface 301, power controller 302, and microcontroller 303. Wireless interface 301 transmits a wireless signal to sensor 104 and receives a wireless signal from sensor 104. The level (strength) of the transmitted wireless signal may be adjusted by microcomputer 302 in response to the charge state reported by sensor 104.

Figure 3B:
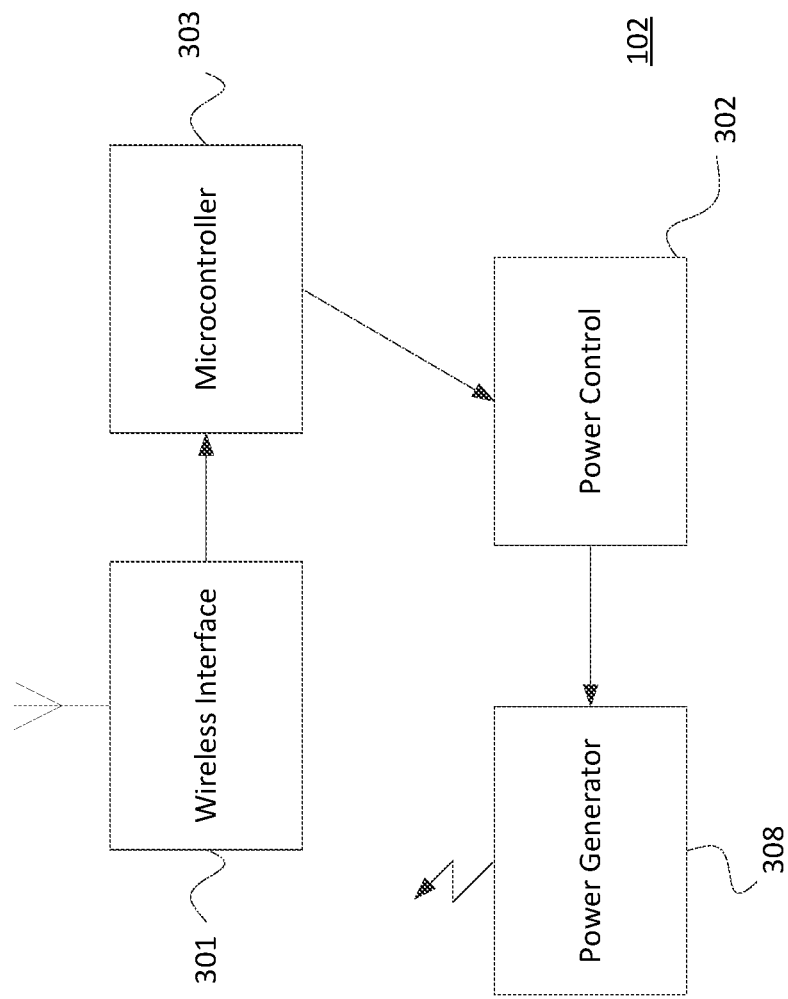
FIG. 3B shows a wireless energy generator in accordance with an embodiment.

FIG. 3B shows an embodiment of wireless energy generator 102 in which reports are received from wireless sensor 104 over a first communication channel (e.g., an RF communication channel) but provides energy to wireless sensor 104 through power generator 308 via a second communication channel (e.g., an ultrasonic communication channel).

With reference to FIGS. 2A, 2B, 3A and 3B, the computing system environment may include a computing device wherein the processes (e.g., shown in FIGS. 4-8) discussed herein may be implemented. The computing device may have a processor for controlling overall operation of the computing device and its associated components, including RAM, ROM, communications module, and memory device. The computing device typically includes a variety of computer readable media. Computer readable media may be any available media that may be accessed by computing device and include both volatile and nonvolatile media, removable and non-removable media. By way of example, and not limitation, computer readable media may comprise a combination of computer storage media and communication media.

Computer storage media may include volatile and non-volatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

In the following flowcharts shown in FIGS. 4-8, there are several terms that should be clarified.

Critical Level: When the measured voltage of energy storage device is below the critical level, the sensor essentially shuts down and needs to be charged by the energy generator but doesn't have enough power to successfully send a message to the energy generator. This approach prevents the sensor from looping as the energy harvester may have insufficient energy to start the product. This condition may be corrected by pre-charging. Otherwise, the energy generator should take preventative action to insure that the sensor does not go into this condition.

Storage Threshold: The storage threshold pertains to the charging level of the sensor's storage device. The measured voltage of the storage device is typically indicative of the charging level. When the voltage is below the storage threshold, the sensor may report that the energy generator should provide energy via the wireless signal so that the sensor can harvest the energy and charge the storage device.

Sensor Threshold: The sensor threshold pertains to the measurement of the intended attribute (e.g., temperature or humidity) measured by a sensor. The sensor threshold value is typically provided by the appliance. This approach is common in RF sensors to minimize transmissions by only transmitting when a value exceeds a critical value (for example, 1 degree F. for a temperature sensor) rather than transmitting every time there is a small change in the attribute.

Figure 4:
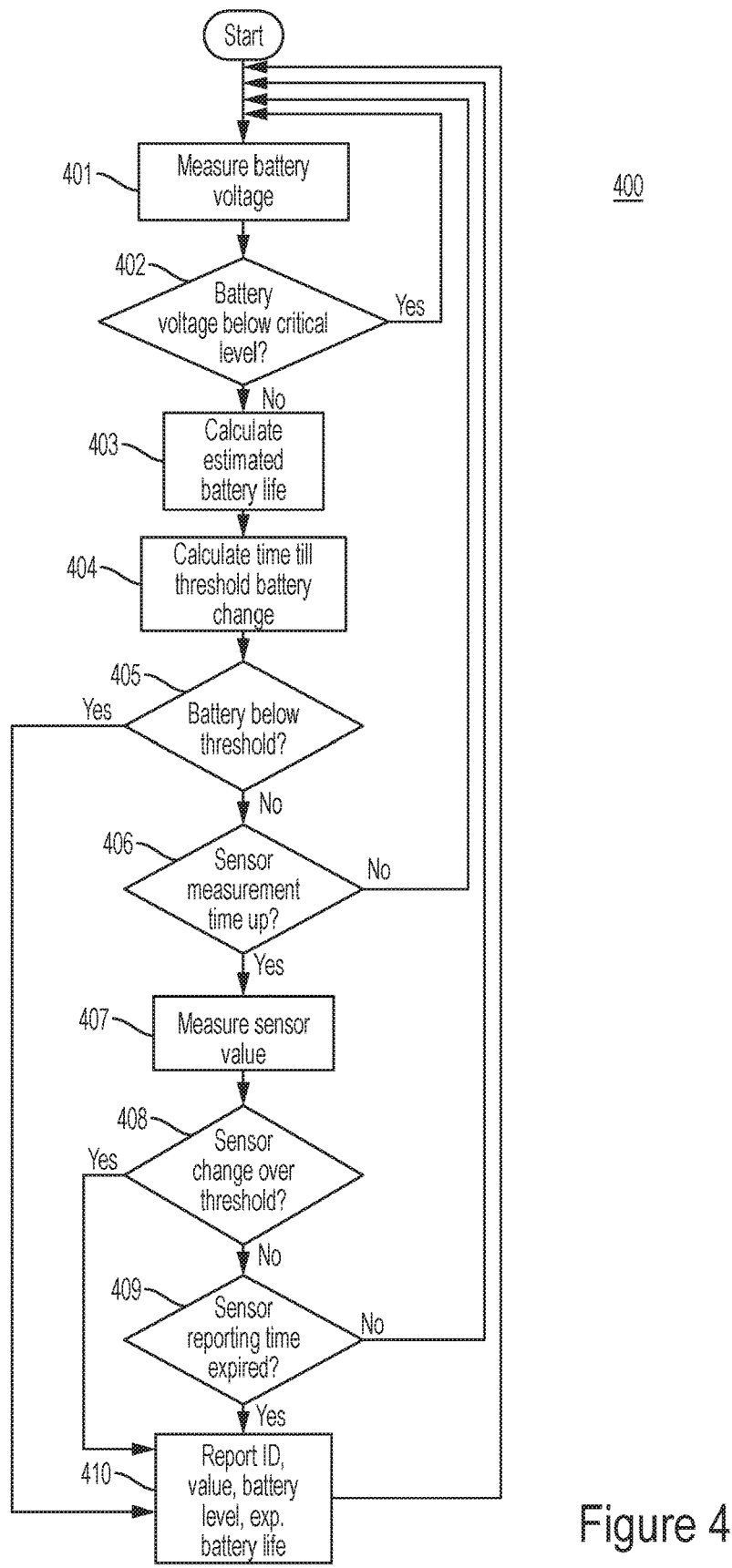
FIG. 4 shows a flowchart for a sensor monitoring the charging level of its storage device and reporting the status in accordance with an embodiment.

FIG. 4 shows flowchart 400 for sensor 104 monitoring the charging level of its storage device and reporting the status in accordance with an embodiment. At block 401, sensor 104 measures the voltage of the storage device. If the measured voltage is below the critical level at block 402, process 400 repeats block 401 in order to conserve the remaining energy storage in the storage device. If not, process 400 continues to block 403 to calculate the estimated battery life of the storage device and to block 404 to determine when the battery voltage reaches the storage threshold.

If the battery voltage is below the storage threshold at block 405, sensor 104 reports the voltage level and other information, such as the remaining battery life, to the wireless generator 102 at block 410. If not, sensor 104 determines whether it should measure the intended attribute, e.g., temperature at block 406. If so, sensor 104 measures the intended attribute at block 407.

If the measured attribute exceeds the sensor threshold at block 408 or the sensor reporting time has expired at block 409, sensor 104 reports the measured attribute value, the voltage level of the storage device, and other information to wireless generator 102.

Figure 5:
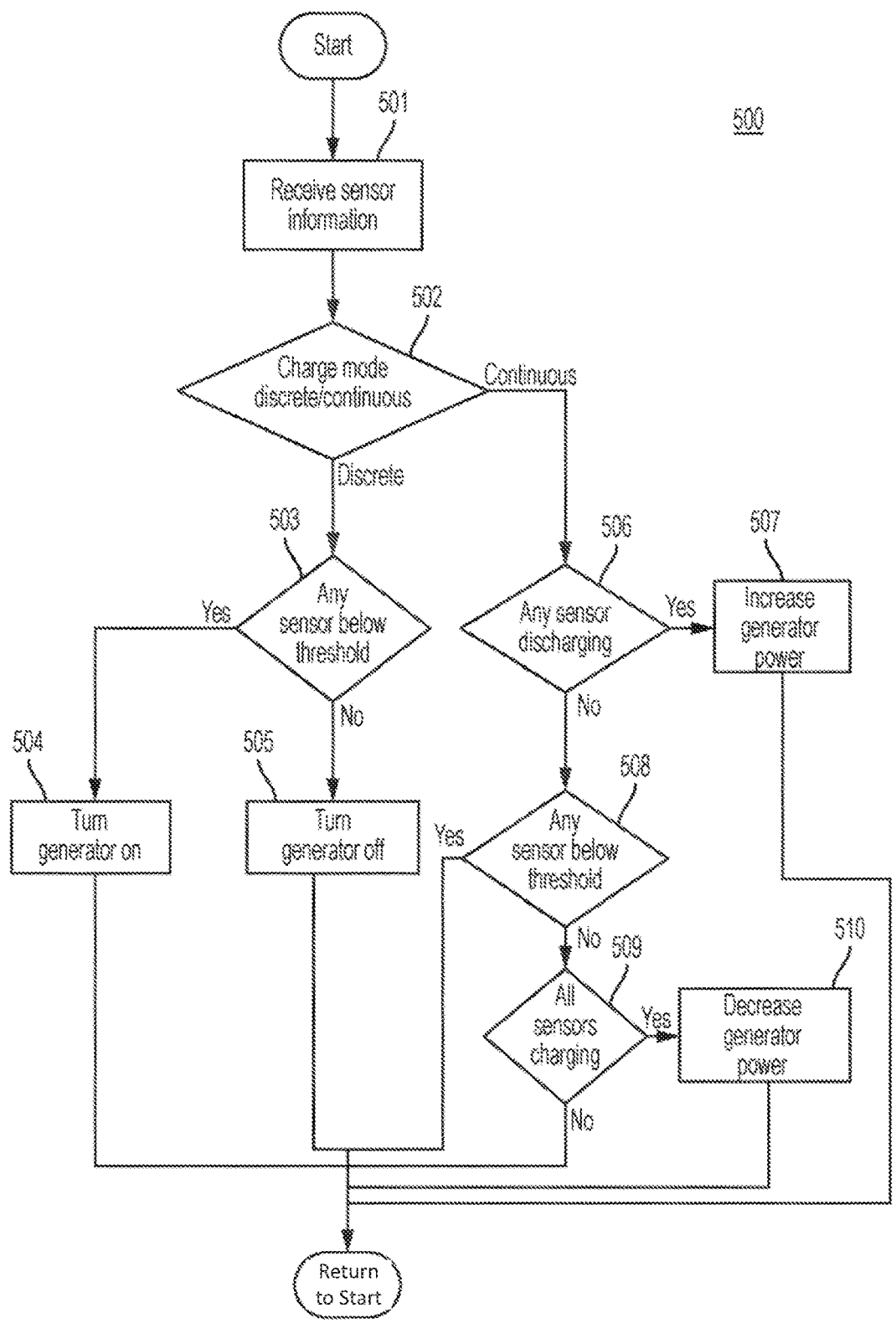
FIG. 5 shows a flowchart for an energy generator that generates a wireless signal in order to charge a sensor in accordance with an embodiment.

FIG. 5 shows flowchart 500 for energy generator 102 that generates a wireless signal in order to charge sensors 104-106. Process 500 is performed in concert with process 400 as performed by sensors 104-106.

At block 501, energy generator 102 receives information from sensors 104-106 that includes charging state information about the corresponding sensor's energy storage device.

There may be different modes of charging. For example, energy generator 102 determines whether it is configured in either a continuous or discrete mode at block 502. When in the discrete mode, energy generator 102 charges sensors 104-106 at only one level at blocks 503-505 when sensors report that the storage device is below the storage threshold. When in the discrete mode and when the charge level of the energy storage device of any sensor is below the threshold, as determined at block 503, energy generator 102 is turned on at block 504. Otherwise, energy generator 102 is turned off at block 505. When in the continuous mode and when the charge level of the energy storage device of any sensor is discharging, as determined at block 506, the power level of energy generator 102 is increased at block 507. Otherwise, when the charge level of the energy storage device of any sensor is below the threshold, as determined at block 508, process 500 returns to the start state. Otherwise, when the charge level of the energy storage device of all sensors are charging, as determined at block 509, the power level of energy generator 102 is decreased. Otherwise, process 500 returns to the start state. When in the continuous mode, energy generator 102 charges sensors 104-106 at one of a plurality of levels at blocks 506-510 based on the state of the energy storage device.

Figure 6:
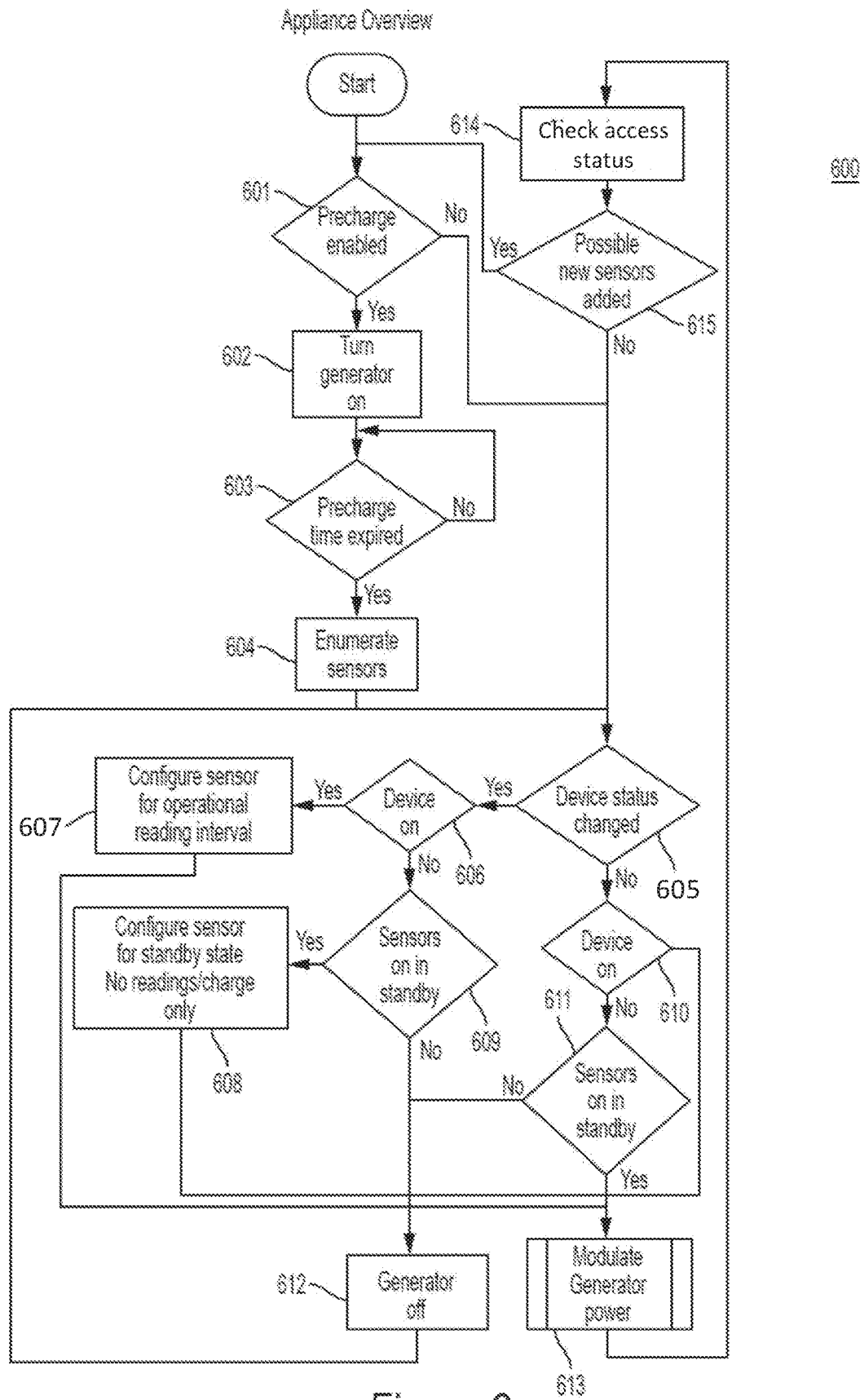
FIG. 6 shows a flowchart for an appliance in accordance with an embodiment.

FIG. 6 shows flowchart 600 for an appliance 101 in accordance with an embodiment. Energy generator 102 precharges sensors 104-106 if precharged-enabled at blocks 601-603. At block 601 energy generator 102 determines whether appliance 101 is precharged-enabled. If so, energy generator 101 turns on its wireless signal at block 602. Otherwise, energy generator 102 determines whether device (sensor) status has changed at block 605. After executing block 602, energy generator 102 determines whether the precharge time has expired at block 603. If not, energy generator 102 continues to execute block 603. Energy generator 102 may charge sensors 104-106 embedded within appliance 101 as well as sensor 111 that may be external or embedded in a paired appliance.

Energy generator 102 determines the registered sensors (referred as enumerated sensors) of appliance 101 at block 604. For example, registration of the sensors may be based on the messaging protocol between energy generator 102 and sensors 104-106. Energy generator 102 subsequently configures and charges sensors (devices) 104-106 at blocks 605-613. At block 605 (as previously discussed) energy generator 102 determines whether device (sensor) status has changed. If so and a device (sensor) is on, as determined at block 606, the device is configured for an operational reading interval at block 607 and energy generator 102 modulates generator power at block 613 (corresponding to process 500 as shown in FIG. 5). If device status has not changed and a device (sensor) is on, as determined at block 610, energy generator 102 modulates its generator power at block 613. If sensors are in the standby state, as determined at block 611, energy generator 102 modulates the generator power at block 613. Referring back to block 606, if a device (sensor) is not on and sensors are in the standby state, as determined by block 609, the sensor is configured for the standby state (where the sensor is charged and there is no reading from the sensor) at block 608. If block 609 determines that the sensors are not in the standby state, energy generator 102 turns off its generator power at block 612.

At blocks 614-615, energy generator 102 accesses status information about sensors 104-106 and adds newly registered sensors. Energy generator 102 check access status at block 614 and determines whether sensors have been added at block 615, If so, blocks 601-604 are executed as previously discussed.

Figure 7:
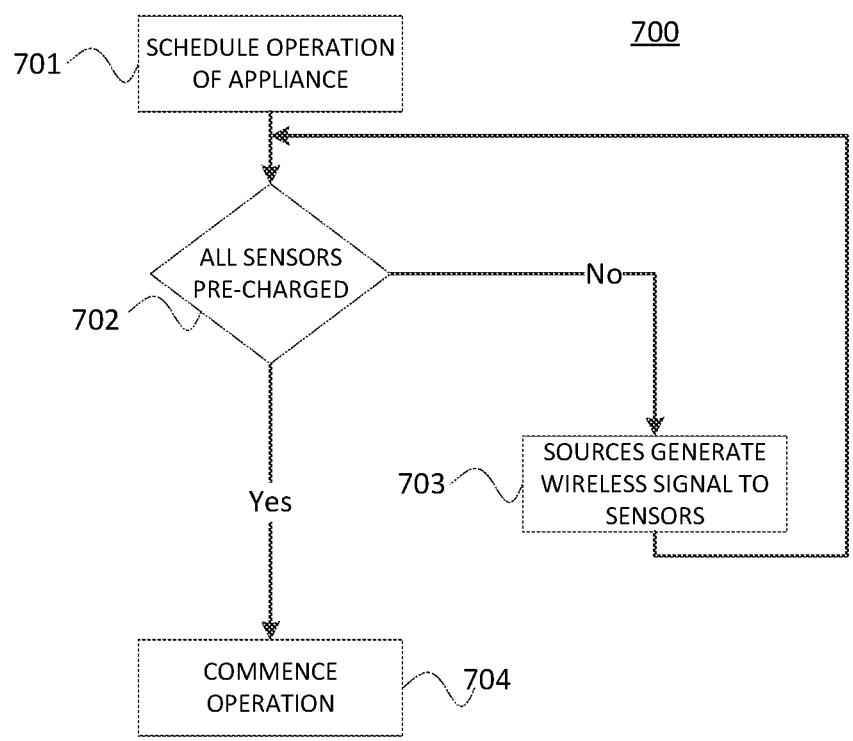
FIG. 7 shows a flowchart for pre-charging sensors in an appliance before commencing operation of the appliance in accordance with an embodiment.

FIG. 7 shows flowchart 700 for pre-charging sensors 104-106 before commencing operation of appliance 101 in accordance with an embodiment. At block 701, a user schedules (initiates) operation of appliance 101. However, before appliance 101 commences operation at block 704, energy generator precharges all of the registered sensors at blocks 702-703 so that all of the sensors operate properly during the operation of appliance 101.

Figure 8:
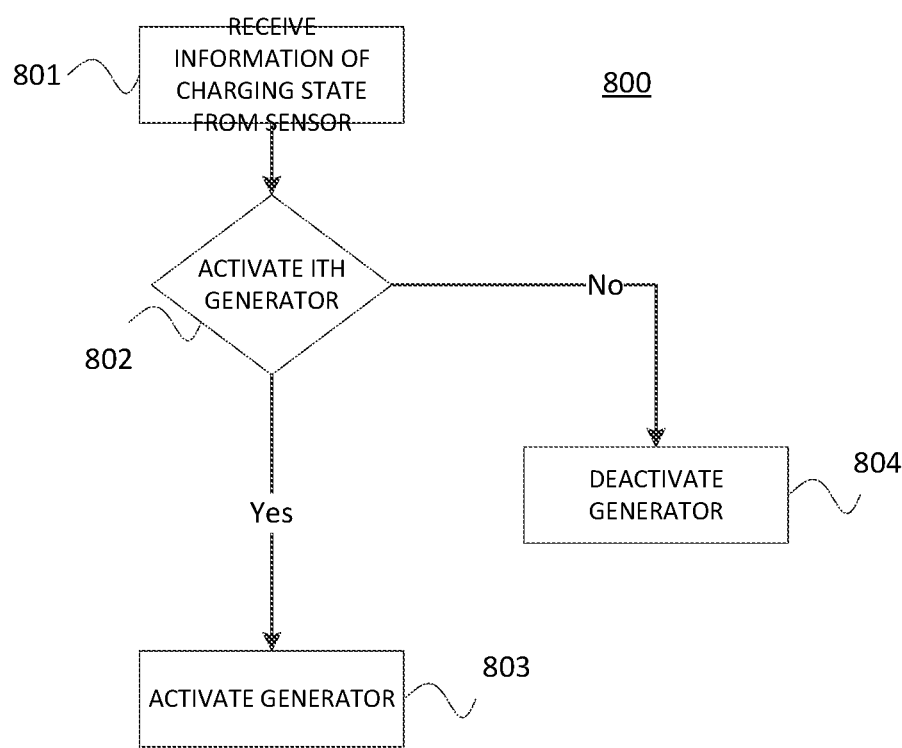
FIG. 8 shows a flowchart for activating one or more energy generators in order to charge a sensor at a desired rate in accordance with an embodiment.

FIG. 8 shows flowchart 800 for activating one or more energy generators 102, 103 in order to charge sensor 104 at a desired rate in accordance with an embodiment. While an energy generator may charge one than one sensor, more than one energy generator can charge a given sensor in order to accelerate the charging of the sensor.

At block 801, sensor 104 reports its charging state to energy generators 102 and 103. If the charging state is sufficiently low, the charging rate may necessitate that more than one energy generator provide wireless signals to sensor 104 so that sensor 104 can charge within a given period of time. Energy generators 102 and 103 may be previously configured so that the energy generators can determine which energy generators should be activated based on the reported charging state at blocks 802-804. At block 802, process 800 determines whether to activate the ith generator. If so, the ith generator is activated at block 803. Otherwise, the ith generator is deactivated at block 804.

The following are some exemplary embodiments:

A system incorporates wireless (e.g., radio frequency and/or ultrasonic) sensors that rely on energy harvesting. The sensors and the system's power supply may be in close proximity so that at least one generator radiates a wireless signal to the sensors in order to supplement the extant ambient energy available for the energy harvesting.

With an embodiment, an RF generator is placed within the fridge cavity, where signals can be communicated to it from the fridge control system. It generates RF at a frequency that is specified for coupling to various sensor tags. By default, sensors are attached to the fridge in the corners so that the user can see the performance of the cooling and ensure that the entire cabinet is kept in a condition so that all food is safe by maintaining specified temperatures within different zones inside the refrigerator. The user then places a bottle of wine inside the fridge with a reusable collar for temperature sensing of the attached bottle. The tag (collar) is automatically recognized by the system and energy is provided by the RF infrastructure inside the refrigerator. The user sets the target temperature for the bottle of wine and then once the bottle starts communicating (having sufficient energy) the target temperature is sent from the fridge to the tag. The tag may either report the temperature every five minutes (or some other configurable time) or send an alert only when it reaches the predefined temperature. The customer then takes the wine bottle out and leaves the tag in the fridge for its next use.

With another embodiment, a washing machine incorporates an ultra-sonic audio generator. When the user puts the clothes into the washing machine, the user also loads in a number of hermetically sealed balls. These balls receive the ultra-sonic sound and convert the sound into electrical energy powering the balls. While the tub is spinning, the ultra-sonic generator provides energy that is harvested by a sensor and turned into electrical energy. As the machine rotates, the sensors provide feedback to the machine about how are they are moving within the tub and the temperatures that the load is experiencing, thus allowing the machine to maintain better temperature control and ensure that through the motion the clothes can be washed properly.

With another embodiment, die cast equipment heats metal to 450 degrees C. but requires sensors to monitor the temperature inside the molten metal. However, a connection back to the power supply may require lengthy, complicated, and expensive wiring. Connecting an RF generator to the main control unit allows the die cast equipment to power a number of sensors monitoring the molten metal using thermocouples, avoiding the wire and the complexity of having to change batteries. The sensors may be permanently powered by the RF transmitter providing regular feedback to the control on the state of the molten metal.

With another embodiment, in order for a stove/range to remotely control the temperature inside a pot of fluid, the high temperatures and range of fluids require that the ball must be completely sealed. Monitoring the surface of the pots is not possible as the relationship to the center of the fluid is highly dependent upon the material and geometry of the pot. A single sensor ball (made from food grade plastic) is placed inside the ball for the purpose of determining the temperature of the fluid. The ball is powered either from a cabled RF generator from the stove unit or alternatively from an RF generator inside the hood above the stove top. This may be referenced as a paired appliance configuration. The RF transmissions from the sensor are recognized by the stove and used to provide a control input to maintain a constant temperature inside the cooking vessel. Alternatively, if the temperature is unable to be maintained (as when the unit is boiling over) a notification can be sent to the user.

The following capabilities may be supported by the embodiments.

A appliance (system) for generating energy to supplement the ambient environment for the purpose of powering one or more incorporated energy harvesting sensors used by a home appliance or a piece of industrial equipment/machinery.

A radio frequency (RF) transmitter where the transmitter is integrated into the appliance by flying leads with or without a connector.

The same RF generator where the transmitter is also used to send messages to the sensor.

A system where new devices/sensors are able to register themselves into an appliance to allow the appliance to communicate with the sensors for the purpose of either sensing and/or energy generation planning.

A system where the control is able to determine a schedule based on time or other conditions in planning the energy generation for the sensors.

A sensor incorporating energy harvesting technology used to provide information either to the equipment for the purpose of control or for providing information to the user.

A system that regulates the energy generating circuitry or shuts it down in response to inputs received from remote sensors.

A system that regulates the power generating circuitry only to be on sufficiently to allow for sensing and/or control of the appliance based on inputs from remote sensors.

An RF transmitter where the transmitter is integrated into a paired appliance for the purpose of providing information to the primary appliance.

A system in which one or more of the sensors is able to communicate their charge states to the generator either directly or indirectly.

A system in which one or more of the sensors is able to communicate its estimated battery life before it requires charging.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Aspects of the invention have been described in terms of illustrative embodiments thereof. Numerous other embodiments, modifications and variations within the scope and spirit of the disclosed invention will occur to persons of ordinary skill in the art from a review of this entire disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. An apparatus for generating energy to supplement an ambient environment, the apparatus comprising:
   a wireless sensor comprising an energy storage device;
   a wireless energy generator; and
   a wireless interface supporting a first wireless communication channel and a second wireless communication channel, wherein:

the wireless energy generator sends a first wireless signal to the wireless sensor over the first wireless communication channel;

the wireless sensor extracts energy from the first wireless signal;

the wireless sensor sends a second wireless signal to the wireless energy generator via the second wireless communication channel, the second wireless signal indicative of energy requirements of the wireless sensor;

the wireless energy generator determines a level of the first wireless signal based on the indicated energy requirements of the energy storage device;

when operating in a continuous mode and the wireless sensor is discharging, the wireless energy generator increases the level of the first wireless signal; and when operating in the continuous mode, the wireless sensor is charging, and a charge level of the energy storage device of the wireless sensor is not below a predetermined threshold, the wireless energy generator decreases the level of the first wireless signal.

2. The apparatus of claim 1, wherein the first wireless communication channel and the second wireless communication channel are different.

3. The apparatus of claim 2, wherein the first wireless communication channel comprises a radio frequency (RF) channel and the second wireless communication channel comprises an ultrasonic channel.

4. The apparatus of claim 1, wherein the first wireless communication channel and the second wireless communication channel are the same.

5. The apparatus of claim 4, wherein the first and second wireless communication channel comprise a radio frequency channel.

6. The apparatus of claim 1, wherein the wireless sensor sends a charging indicator indicative of a charge state of the energy storage device.

7. The apparatus of claim 1, wherein the energy storage device comprises a battery and wherein:
the wireless sensor determines an estimated battery life before the battery requires charging; and
the estimated battery life is conveyed over the second wireless communication channel to the wireless energy generator.

8. The apparatus of claim 1, wherein:
the wireless sensor measures an attribute of an entity associated with and distinct from the wireless sensor; and
the wireless sensor includes an attribute indicator in the second wireless signal, the attribute indicator indicative of the attribute measurement.

9. An apparatus for generating energy to supplement an ambient environment, the apparatus comprising:
a wireless sensor comprising an energy storage device;
a wireless energy generator; and
a wireless interface supporting a first wireless communication channel and a second wireless communication channel, wherein:
the wireless energy generator sends a first wireless signal to the wireless sensor over the first wireless communication channel;
the wireless sensor extracts energy from the first wireless signal;
the wireless sensor sends a second wireless signal to the wireless energy generator via the second wireless communication channel, the second wireless signal indicative of energy requirements of the wireless sensor; and
the wireless energy generator determines a level of the first wireless signal based on the indicated energy requirements of the energy storage device;
when operating in a discrete mode and a charge level of the energy storage device of the wireless sensor is not greater than a predetermined threshold, the wireless energy generator activates the first wireless signal; and
when operating in the discrete mode and the charge level of the energy storage device of the wireless sensor is greater than the predetermined threshold, the wireless energy generator deactivates the first wireless signal.

10. The apparatus of claim 9, wherein the first wireless communication channel and the second wireless communication channel are different.

11. The apparatus of claim 10, wherein the first wireless communication channel comprises a radio frequency (RF) channel and the second wireless communication channel comprises an ultrasonic channel.

12. The apparatus of claim 9, wherein the first wireless communication channel and the second wireless communication channel are the same.

13. The apparatus of claim 12, wherein the first and second wireless communication channel comprise a radio frequency channel.

14. The apparatus of claim 9, wherein the wireless sensor sends a charging indicator indicative of a charge state of the energy storage device.

15. The apparatus of claim 9, wherein the energy storage device comprises a battery and wherein:
the wireless sensor determines an estimated battery life before the battery requires charging; and
the estimated battery life is conveyed over the second wireless communication channel to the wireless energy generator.

16. The apparatus of claim 9, wherein:
the wireless sensor measures an attribute of an entity associated with and distinct from the wireless sensor; and
the wireless sensor includes an attribute indicator in the second wireless signal, the attribute indicator indicative of the attribute measurement.

17. An apparatus for generating energy to supplement an ambient environment, the apparatus comprising:
a wireless sensor comprising an energy storage device;
a wireless energy generator; and
a wireless interface supporting a first wireless communication channel and a second wireless communication channel, wherein:
the wireless energy generator sends a first wireless signal to the wireless sensor over the first wireless communication channel;
the wireless sensor extracts energy from the first wireless signal;
the wireless sensor sends a second wireless signal to the wireless energy generator via the second wireless communication channel, the second wireless signal indicative of energy requirements of the wireless sensor;
the wireless energy generator determines a level of the first wireless signal based on the indicated energy requirements of the energy storage device;

the wireless energy generator comprises a radio frequency (RF) generator;

the wireless energy generator sends messages to the wireless sensor; and the RF generator is integrated into the apparatus by flying leads.

18. A system for generating energy and extracting the energy to supplement an ambient environment, the system comprising:

a plurality of wireless sensors comprising a first and second wireless sensor;

a first wireless energy generator; and a wireless interface supporting a first wireless communication channel and a second wireless communication channel, wherein:

the first wireless energy generator sends a first wireless signal to the first and second wireless sensors over the first wireless communication channel;

the first and second wireless sensors extract a portion of the energy from the first wireless signal;

the first wireless sensor sends a second wireless signal to the first wireless energy generator via the second wireless communication channel, the second wireless signal indicative of energy requirements of the first wireless sensor;

the second wireless sensor sends a third wireless signal to the first wireless energy generator via the second wireless communication channel, the third wireless signal indicative of energy requirements of the second wireless sensor; and the first wireless energy generator adjusts a level of the first wireless signal based on the indicated energy requirements of the first and second wireless sensors.

19. The system of claim 18, wherein:

the first and second wireless sensors register with the first wireless energy generator; and the first and second wireless sensors communicate with the first wireless energy generator over the second wireless communication channel after registering.

20. The system of claim 19, wherein:

the first wireless energy generator pre-charges all registered wireless sensors.

21. The system of claim 18, wherein:

the first wireless energy generator schedules energy generation for the first and second wireless sensors based on time and the indicated energy requirements of the first and second wireless sensors.

22. The system of claim 18, wherein:

when operating in a continuous mode and at least one of the first wireless sensor and the second wireless sensor is discharging, the first wireless energy generator increases the level of the first wireless signal; and when operating in the continuous mode, the first wireless sensor and the second wireless sensor are charging, and a charge level of an energy storage device of at least one of the first wireless sensor and the second wireless sensor is not below a predetermined threshold, the first wireless energy generator decreases the level of the first wireless signal.

23. The system of claim 18, wherein:

when operating in a discrete mode and a charge level of an energy storage device of at least one of the first wireless sensor and the second wireless sensor is not greater than a predetermined threshold, the wireless energy generator activates the first wireless signal; and when operating in the discrete mode and the charge level of the energy storage device of the first wireless sensor and the second wireless sensor are greater than the predetermined threshold, the wireless energy generator deactivates the first wireless signal.

24. The system of claim 18 comprising a second wireless energy generator, wherein:

the second wireless energy generator sends a fourth wireless signal to the first and second wireless sensors over the first wireless communication channel to accelerate charging first and second storage devices of the first and second wireless sensors, respectively.

* * * * *